US011651689B2

(12) United States Patent
Saxena et al.

(10) Patent No.: US 11,651,689 B2
(45) Date of Patent: May 16, 2023

(54) METHOD, APPARATUS, AND COMPUTER PROGRAM PRODUCT FOR IDENTIFYING STREET PARKING BASED ON AERIAL IMAGERY

(71) Applicant: HERE Global B.V., Eindhoven (NL)

(72) Inventors: Shishir Saxena, Mumbai (IN); Huzefa Calcuttawala, Thane (IN); Akash Paradkar, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 790 days.

(21) Appl. No.: 16/543,951

(22) Filed: Aug. 19, 2019

(65) Prior Publication Data

US 2021/0056847 A1    Feb. 25, 2021

(51) Int. Cl.
| | |
|---|---|
| *G08G 1/14* | (2006.01) |
| *B64C 39/02* | (2023.01) |
| *B64D 47/08* | (2006.01) |
| *G06V 10/22* | (2022.01) |

(Continued)

(52) U.S. Cl.
CPC ........... *G08G 1/141* (2013.01); *B64C 39/024* (2013.01); *B64D 47/08* (2013.01); *G06V 10/22* (2022.01); *G06V 10/751* (2022.01); *G06V 20/182* (2022.01); *B64C 2201/123* (2013.01); *G06V 2201/08* (2022.01)

(58) Field of Classification Search
CPC .......... G08G 1/141; G08G 1/04; G08G 1/143; G08G 1/144; G08G 1/147; G08G 1/146; B64C 39/024; B64C 2201/123; B64D 47/08; G06V 10/22; G06V 10/751; G06V 20/182; G06V 2201/08; G06V 20/70; G06V 10/267; G06V 20/176
USPC ......................................................... 701/538
See application file for complete search history.

(56) References Cited

U.S. PATENT DOCUMENTS

| | | |
|---|---|---|
| 9,275,297 B2 | 3/2016 | Tabb |
| 10,235,580 B2 | 3/2019 | Belzner et al. |

(Continued)

OTHER PUBLICATIONS

Koutaki et al. ("Extraction of Parking Lot Structure From Aerial Image in Urban Areas", International Journal of Innovative Computing, Information and Control vol. 12, No. 2, Apr. 2016, ICIC International 2016 ISSN 1349-4198 , pp. 371-383.*

(Continued)

*Primary Examiner* — Muhammad Shafi
(74) *Attorney, Agent, or Firm* — Alston & Bird LLP (57) ABSTRACT

A method, apparatus, and computer program product are provided for identifying on-street parking from aerial imagery. A method may include: receiving an aerial image of a geographic region; applying an object detection algorithm to the received aerial image to identify vehicle objects within the aerial image; identifying one or more clusters of vehicle objects within the aerial image; generating cluster lines for the one or more clusters of vehicle objects; map matching the cluster lines for the one or more clusters of vehicle objects to a map of the geographic region; and identifying on-street parking for a road segment in response to a cluster line of the cluster lines for the one or more clusters of vehicle objects satisfying predetermined criteria with respect to the road segment.

20 Claims, 7 Drawing Sheets

(51) Int. Cl.
*G06V 10/75* (2022.01)
*G06V 20/10* (2022.01)

(56) References Cited

U.S. PATENT DOCUMENTS

2015/0104070 A1* 4/2015 Tabb ............... G06V 20/176
                                                            382/104
2016/0239983 A1* 8/2016 Dorum ............. G06V 20/182
2019/0094858 A1   3/2019 Radosavljevic et al.
2020/0355515 A1* 11/2020 Saxena ............. G06V 20/176

OTHER PUBLICATIONS

Fu, C-Y. et al., *DSSD: Deconvolutional Single Shot Detector* [online] [retrieved Oct. 8, 2019]. Retrieved via the Internet: https://ariv.org/pdf/1701.06659.pdf (dated Jan. 23, 2017) 11 pages.

Koutaki, G. et al., *Extraction of Parking Lot Structure From Aerial Image in Urban Areas*, International Journal of innovative Computing, Informationa and control, vol. 12, No. 2 (Apr. 2016) 371-383.

* cited by examiner

FIG. 7

# METHOD, APPARATUS, AND COMPUTER PROGRAM PRODUCT FOR IDENTIFYING STREET PARKING BASED ON AERIAL IMAGERY

TECHNOLOGICAL FIELD

An example embodiment of the present invention relates to identifying street parking spaces proximate a road, and more particularly, to using aerial imagery to determine probable parking spaces, and synthesize these spaces with existing parking information to improve confidence of the determination.

BACKGROUND

Digital maps identify the network of roads and increasingly identify a number of other features that are of interest to drivers. For example, digital maps oftentimes identify parking spaces that may be utilized by the drivers. While information regarding parking spaces may be gathered manually or by the analysis of images that have been captured, such information is labor intensive to collect and may be incomplete or outdated. In this regard, the parking spaces that are available may change over time, such as a result of construction or the change in availability of parking due to various events. As such, digital maps that rely upon information regarding parking spaces that was gathered manually or by the analysis of images may not be accurate after the passage of time as the underlying information may become stale and no longer representative of the current parking availability.

Techniques have been developed to extract and detect off-street parking spaces from global positioning system (GPS) probe data, but such techniques do not to extend to the detection of on-street parking spaces from GPS probe data. Traditional algorithms use deterministic and rule-based approaches for discerning off-street parking spaces, which may require constant and regular revision of the algorithms over time as trends in GPS probe data change and newer probe data emerges. Traditional approaches may also perform poorly when probe data becomes large in size for a particular road segment as it may be difficult to differentiate parking spaces from noise. Hence, these approaches do not readily extend to the determination of on-street parking, especially in ever-changing, fast growing, and dynamic cities.

BRIEF SUMMARY

A method, apparatus, and computer program product are provided in accordance with an example embodiment described herein for identifying on-street parking availability from aerial imagery. In an example embodiment, a method is provided for determining a presence of on-street parking, where the method may be implemented by a processor including memory and computer program code. The method may include: receiving an aerial image of a geographic region; applying an object detection algorithm to the received aerial image to identify vehicle objects within the aerial image; identifying one or more clusters of vehicle objects within the aerial image; generating cluster lines for the one or more clusters of vehicle objects; map matching the cluster lines for the one or more clusters of vehicle objects to a map of the geographic region; and identifying on-street parking for a road segment in response to a cluster line of the cluster lines for the one or more clusters of vehicle objects satisfying predetermined criteria with respect to the road segment.

According to some embodiments, the predetermined criteria with respect to the road segment may include a predefined alignment tolerance between the cluster line and the road segment. The predetermined criteria with respect to the road segment may include a predefined distance from the road segment. Identifying one or more clusters of vehicle objects within the aerial image may include: identifying a group of vehicle objects as a cluster in response to the vehicle objects of the group being within a predefined distance of at least one other vehicle object of the group and the vehicle objects of the group having a long dimension of their respective bounding boxes within a predefined degree of alignment with one another.

Identifying on-street parking for a road segment may be performed in response to probe data points along the road segment confirming the presence of on-street parking. Receiving an aerial image of a geographic region may include receiving a cropped image of a geographic region, where the method may further include reconstructing a plurality of cropped image of the geographic region in response to identifying one or more clusters of vehicle objects within the aerial image. In response to identifying on-street parking for a road segment, methods may include providing route guidance to the on-street parking for the road segment proximate a destination of the route guidance.

Embodiments provided herein may include an apparatus having at least one processor and at least one memory including computer program code. The at least one memory and computer program code may be configured to, with the processor, cause the apparatus to at least: receive an aerial image of a geographic region; apply an object detection algorithm to the received aerial image to identify vehicle objects within the aerial image; identify one or more cluster of vehicle objects within the aerial image; generate cluster lines for the one or more clusters of vehicle objects; map match the cluster lines for the one or more clusters of vehicle objects to a map of the geographic region; and identify on-street parking for a road segment in response to a cluster line of the cluster lines for the one or more clusters of vehicle objects satisfying predetermined criteria with respect to the road segment.

According to some embodiments, the predetermined criteria with respect to the road segment may include a predefined alignment tolerance between the cluster line and the road segment. The predetermined criteria with respect to the road segment may include a predefined distance from the road segment. Causing the apparatus to identify one or more clusters of vehicle objects within the aerial image may include causing the apparatus to: identify a group of vehicle objects as a cluster in response to the vehicle objects of the group being within a predefined distance of at least one other vehicle object of the group and the vehicle objects of the group having a long dimension of their respective bounding boxes within a predetermined degree of alignment with one another.

Causing the apparatus of some embodiments to identify on-street parking for a road segment may be in response to probe data points along the road segment confirming the presence of on-street parking. Causing the apparatus to receive an aerial image of a geographic region may include causing the apparatus to receive a cropped image of a geographic region, where the apparatus may further be caused to reconstruct a plurality of cropped images of the geographic region in response to identifying one or more clusters of vehicle objects within the cropped image of the geographic region. In response to causing the apparatus to identify on-street parking for a road segment, the apparatus may further be caused to provide route guidance to the on-street parking for the road segment proximate a destination of the route guidance.

Embodiments provided herein may include a computer program product having at least one non-transitory computer-readable storage medium having computer-executable program code portions stored therein. The computer-executable program code portions may include program code instructions configured to: receive an aerial image of a geographic region; apply an object detection algorithm to the received aerial image to identify vehicle objects within the aerial image; identify one or more clusters of vehicle objects within the aerial image; generate cluster lines for the one or more clusters of vehicle objects; map match the cluster lines for the one or more clusters of vehicle objects to a map of the geographic region; and identify on-street parking for a road segment in response to a cluster line of the cluster lines for the one or more clusters of vehicle objects satisfying predetermined criteria with respect to the road segment.

The predetermined criteria with respect to the road segment may include a predefined alignment tolerance between the cluster line and the road segment. The predetermined criteria with respect to the road segment may include a predefined distance from the road segment. The program code instructions to identify one or more clusters of vehicle objects within the aerial image may include program code instructions to: identify a group of vehicle objects as a cluster in response to the vehicle objects of the group being within a predefined distance of at least one other vehicle object of the group and the vehicle objects of the group having a long dimension of their respective bounding boxes within a predetermined degree of alignment with one another.

The program code instructions to identify on-street parking for a road segment may further be in response to probe data points along the road segment identifying the on-street parking. The program code instructions to receive an aerial image of a geographic region may include program code instructions to receive a cropped image of a geographic region, the computer program product further including program code instructions to reconstruct a plurality of cropped images of the geographic region in response to identifying one or more clusters of vehicle objects within the cropped image of the geographic region.

In an example embodiment, an apparatus is provided for determining a presence of on-street parking, where the apparatus may include: means for receiving an aerial image of a geographic region; means for applying an object detection algorithm to the received aerial image to identify vehicle objects within the aerial image; means for identifying one or more clusters of vehicle objects within the aerial image; means for generating cluster lines for the one or more clusters of vehicle objects; means for map matching the cluster lines for the one or more clusters of vehicle objects to a map of the geographic region; and means for identifying on-street parking for a road segment in response to a cluster line of the cluster lines for the one or more clusters of vehicle objects satisfying predetermined criteria with respect to the road segment.

According to some embodiments, the predetermined criteria with respect to the road segment may include a predefined alignment tolerance between the cluster line and the road segment. The predetermined criteria with respect to the road segment may include a predefined distance from the road segment. The means for identifying one or more clusters of vehicle objects within the aerial image may include: means for identifying a group of vehicle objects as a cluster in response to the vehicle objects of the group being within a predefined distance of at least one other vehicle object of the group and the vehicle objects of the group having a long dimension of their respective bounding boxes within a predefined degree of alignment with one another.

The means for identifying on-street parking for a road segment may be performed in response to probe data points along the road segment confirming the presence of on-street parking. The means for receiving an aerial image of a geographic region may include means for receiving a cropped image of a geographic region, where the apparatus may further include means for reconstructing a plurality of cropped image of the geographic region in response to identifying one or more clusters of vehicle objects within the aerial image. In response to identifying on-street parking for a road segment, the apparatus may include means for providing route guidance to the on-street parking for the road segment proximate a destination of the route guidance.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for identifying street parking based, at least in part, on aerial imagery. Finding a parking space can be time consuming and frustrating, particularly in city centers or other similar areas where parking spaces may be limited or the number of parkers is high. Historically, navigation systems (e.g., embedded car navigation systems) may offer assistance in these situations by indicating parking facilities (e.g., surface parking lots, parking garages, etc.) that are nearby. Moreover, the presentation of available parking facilities may not provide information relating to street parking availability.

Figure 1:
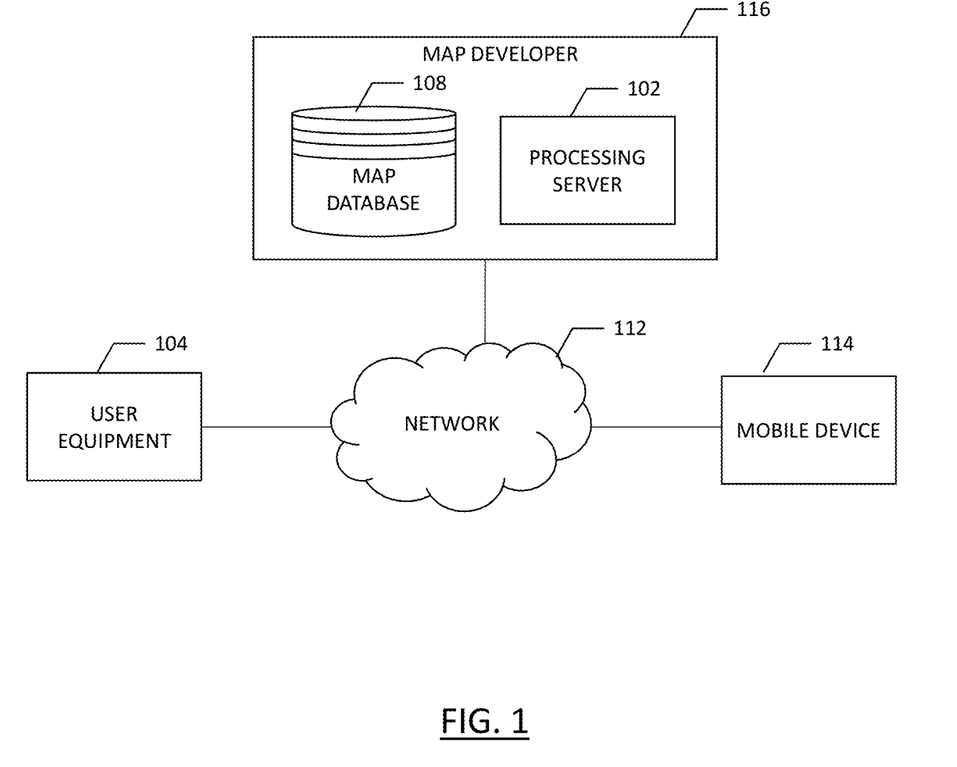
FIG. 1 illustrates a communications diagram for identifying on-street parking based on aerial imagery in accordance with an example embodiment of the present disclosure.

To provide an improved manner of identifying on-street parking, a system as illustrated in FIG. 1 enables the ability to identify on-street parking locations based, at least in part, on aerial imagery analysis. FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to parking space availability along different road segments of the map database. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, or non-motorized vehicle probe data (e.g., from bicycles, scooters, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

Figure 2:
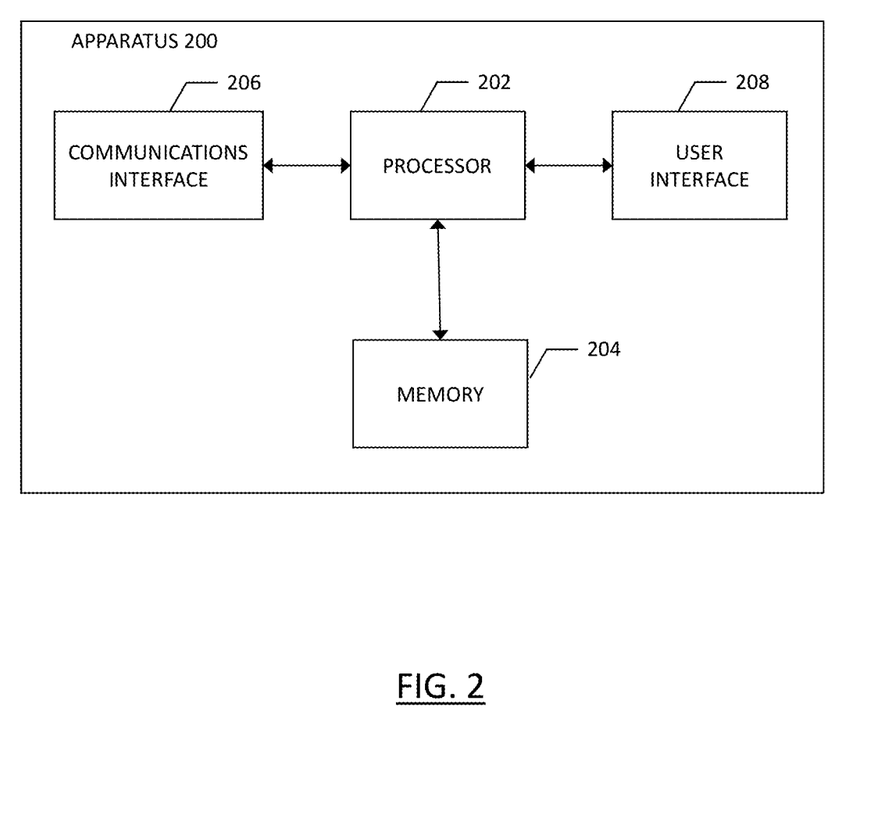
FIG. 2 is a block diagram of an apparatus that may be specifically configured for establishing on-street parking from aerial imagery in accordance with an example embodiment of the present disclosure.

An example embodiment of a processing server 102 may be embodied in an apparatus as illustrated in FIG. 2. The apparatus 200, such as that shown in FIG. 2, may be specifically configured in accordance with an example embodiment of the present disclosure for estimating on-street parking along road segments based, at least in part, on aerial imagery. The apparatus 200 may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for using aerial imagery to determine probable parking spaces along road segments or "on-street" parking. On-street parking may include parallel parking with vehicles parked substantially parallel to a roadway, or parking spaces designated along the side of a road segment that may be at an angle with respect to the direction of travel. Embodiments may synthesize probable parking spaces estimated from aerial imagery with co-located parking information on a given road segment based on vehicle probe data to provide more confident predictions with respect to parking locations along the road segment. Vehicle data may be collected through probes which collect data points in the form of an ordered list of GPS (global positioning system) locations where the vehicle has traveled and a time associated with each GPS location. Additional data may be included with probe data, such as vehicle identification, environmental conditions, or the like; however, for purposes of the invention described herein, the probe data may at least include location and time, while other data may be superfluous. The time associated with probe data may include date and time, while the GPS location may include coordinates, such as longitude and latitude of the location. The probe data, through map-matching to links representing road segments, may form a track for a particular probe or vehicle associated with the probe.

Establishing information about on-street parking benefits drivers and local merchants by providing access of customers to merchants and facilitating transactions. Embodiments provided herein use aerial imagery in the focused context of street parking and may be used in concert with other data, such as vehicle probe data, to more reliably determine street parking spaces to improve convenience for a user and to improve an overall user experience. Embodiments described herein provide a method to assimilate information from aerial imagery to establish probable parking spaces, and synthesize these probable spaces with existing co-located information related to parking to provide greater confidence as to the existence and availability of street parking.

Embodiments described herein may implement artificial intelligence and machine learning to establish where parking locations along a road segment are likely to be based on aerial imagery. Machine learning is often used to develop a particular pattern recognition algorithm (e.g., an algorithm that represents a particular pattern recognition problem, such as the determination of on-street parking described herein) that is based on statistical inference. In some embodiments, the apparatus 200, such as the processor 202 or the like, receives large quantities of data (e.g., aerial imagery) and determines whether the on-street parking exists based on pattern recognition and map matching the recognized patterns to a map of a map database.

For example, a set of clusters may be developed by the apparatus 200, such as the processor 202 or the like, using unsupervised learning, in which the number and respective sizes of the clusters is based on calculations of similarity of features of the patterns within a previously collected training set of patterns. In another example, a classifier representing a particular categorization problem may be developed by the apparatus 200, such as the processor 202 or the like, using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, the AI and models described herein use "deep learning". Deep learning is a subset of machine learning that generates models based on training data sets that have been provided. In some embodiments, the training model may use unsupervised learning techniques including clustering, anomaly detection, Hebbian Learning, as well as techniques for learning latent variable models such as an Expectation-maximization algorithm, a method of moments (mean, covariance), and Blind signal separation techniques, which include principal component analysis, independent component analysis, non-negative matrix factorization, and singular value decomposition.

Embodiments described herein may use an object detection such as the "you only look once" or YOLO object detector to quickly detect objects in an image. YOLO is a fully convolutional neural network which processes an image and outputs a prediction of the location of objects within the processed image. YOLO version 3 or YOLO-V3 applies a single neural network to a full image to divide the image into regions and predict bounding boxes and probabilities for each region. The bounding boxes may be weighted by the predicted probabilities. However, embodiments described herein may modify YOLO-V3 to introduce deconvolution layers in the place of non-parametric up-sampling layers. This modification provides object detection to accurately identify objects of different sizes, particularly small objects relative to the image size, within the image. Embodiments further employ a clustering technique, such as a K-means clustering technique, to find optimal sizes and accordingly, create homogeneous clusters of such objects. A straight line passing through the cluster in any collaboration pattern (e.g., straight or parallel) can be established and geospatial aspects on the line may then be found. The established line made of geospatial coordinates may then be map-matched to establish if the cluster of detected objects (parking spaces) are proximate a street. These map-matched clustered objects can be geo-spatially matched over street parking "seeds" which are spatial data from vehicle probes, as described further below, to enhance the probability of accurately establishing street parking locations.

An example embodiment of the present disclosure will be described herein with respect to the process flow illustrated in FIG. 3. Aerial images may be available or collected for a geographical region. These aerial images may be high-resolution satellite images or images captured by aerial vehicles such as drones or plates, for example. The aerial images may be stored in a database, such as aerial image repository 302 of FIG. 3. These aerial images may be cropped or segmented to obtain smaller aerial images suitable for processing by object recognition algorithms described herein. The cropped or segmented images may be processed at 304 where an object detection model is used to detect vehicles in the image. The object detection model may be, for example, a modified version of YOLO-V3.

The YOLO-V3 object detection model is a single shot fully convolutional detector. The model detects objects at three scales using three anchor boxes for each scale. The YOLO-V3 feature extractor is a hybrid approach between the network used in VOLO-V2, Darknet-19, and Resnet 152. YOLO-V3 uses a variant of Darknet, which originally includes a fifty-three layer network trained on Imagent. For the task of detection, fifty-three more layers are stacked onto the original layers resulting in a one-hundred and six layer fully convolutional underlying architecture for YOLO-V3. As the model is a single shot fully convolutional detector, object detection is fast and efficient.

Using the YOLO-V3 model provides improved precision and accuracy with respect to small objects relative to the image size. Geographical regions are large areas to cover with aerial images, such that each aerial image may cover a substantial space. This results in vehicles being relatively small based on the image. To accurately detect vehicles, a model with the ability to detect relatively small objects is necessary. Detections of objects at different layers in the YOLO-V3 model enables the accurate detection of small objects. The up-sampled layers concatenated with previously layers help preserve the fine-grained features which help in detecting small objects.

While YOLO-V3 provides an accurate method to detect small objects in an image, given the challenges of detecting vehicles in aerial imagery, modifications to the YOLO-V3 model may provide an even better method to detect such small objects. As noted above, YOLO-V3 makes predictions at three scales. The feature map from the seventy-ninth layer of the model is subjected to a few convolutional layers before being up-sampled by two times. A similar procedure is followed again, where the feature map from the ninety-first layer is subjected to a few convolutional layers and then again up-sampled by two times and depth concatenated with feature map from the thirty-sixth layer. Embodiments described herein replaces these up-sampling layers with deconvolutional layers, which are essentially convolutional neural layers working in the opposite direction of the standard convolutional neural network. Deconvolutional layers, like convolutional layers, have weights which can be learned to give optimal up-sampling output. Bilinear up-sampling layers, on the other hand, use fixed up-sampling with no weights. Hence, they cannot be trained to learn optimal up-sampling. The trainable feature of deconvolutional neural layers is desirable considering how challenging it is to detect vehicles in aerial images.

Figure 4:
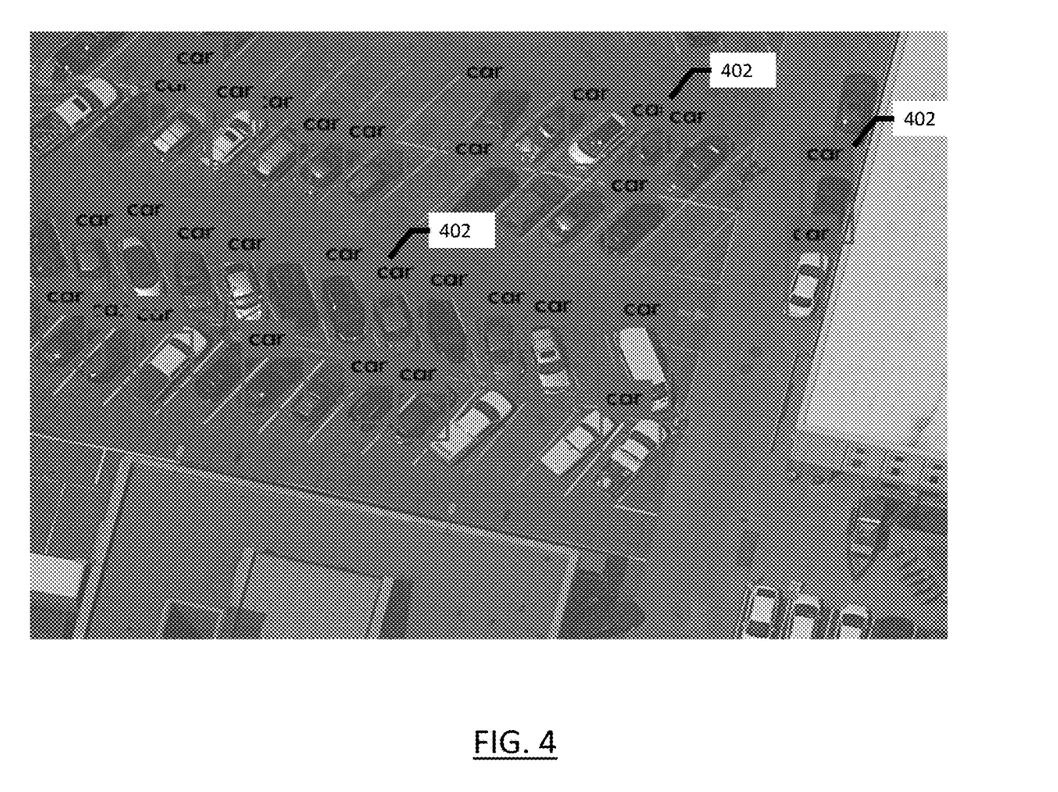
FIG. 4 depicts a plurality of bounding boxes around objects detected by an object detection algorithm according to an example embodiment of the present disclosure.

A critical feature to the performance of object detection networks is the size of the anchor boxes. Anchor boxes should be such that all the possible sizes of ground truth bounding boxes are covered or the network does not learn how to differentiate between background and the object, and the predicted bounding boxes are far off from the actual boxes. A clustering technique may be used to find the optimal size of anchor boxes according to embodiments described herein. A K-means clustering algorithm may be used for example embodiments as the number of clusters is pre-defined and both height and width of the boxes are numbers such that calculating Euclidean distance is straight forward. The anchor boxes determined using this technique had an Intersection over Union (IoU) of approximately 0.75 with the ground truth bounding boxes according to processed aerial images. The ground truth bounding boxes are bounding boxes confirmed by manual processes and deemed to be entirely accurate, such that an IoU of 0.75 with respect to ground truth bounding boxes using the modified YOLO-V3 object detection method described herein provides a reasonably accurate method of detecting vehicles within an aerial image. FIG. 4 illustrates an example embodiment of bounding boxes identified according to the modified YOLO-V3 method described herein, where some, but not all vehicles 402 are identified.

Figure 5:
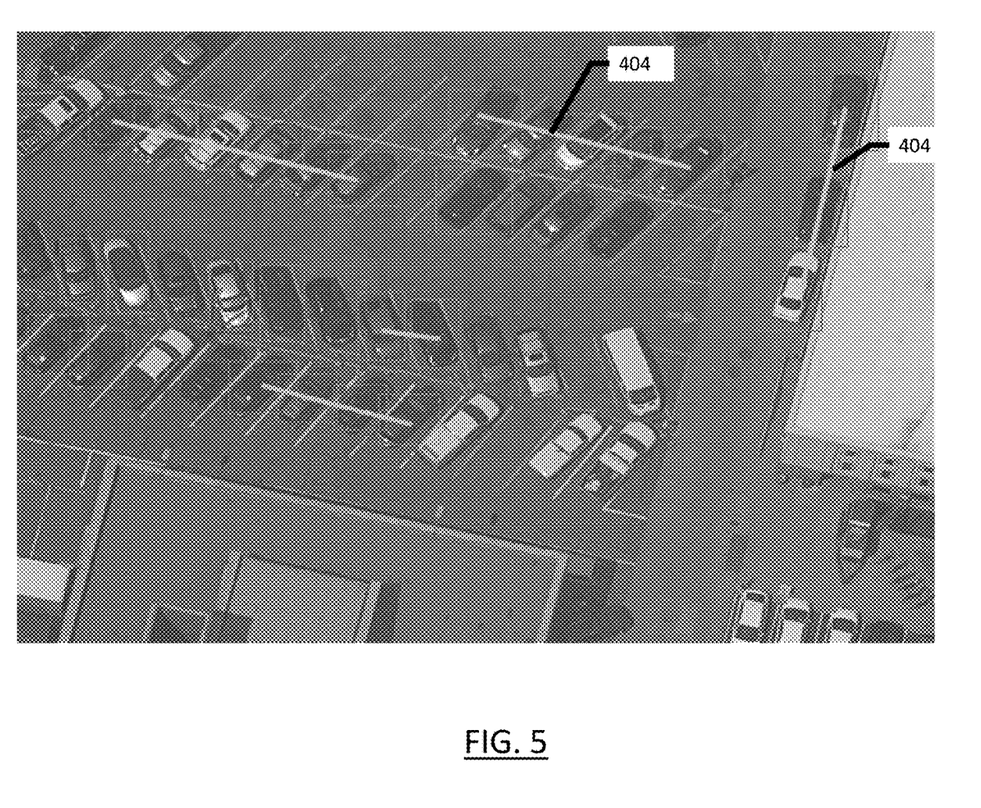
FIG. 5 illustrates the formation of cluster lines among clusters of objects detected by the object detection algorithm according to an example embodiment of the present disclosure.

Object detection alone is not sufficient to establish parking spaces along a road segment as described herein. A such, once the vehicles are detected as objects using the object detection method, for each detected vehicle, we consider all bounding boxes within a certain radius from edges of the box, such as within one meter of the edges of the box. For all vehicles detected within this radius, only those vehicles whose centers lie on a line which are substantially parallel (e.g., within ten degrees) to either of the image axes and whose long sides are almost parallel (e.g., within ten degrees). If no other vehicles are found to meet these criteria, the vehicle is considered an isolated vehicle. This process is performed on all detected vehicles within the image. For detected clusters of vehicles, a center line may be drawn across the same to generate a cluster line. The position of the line with respect to the original image are persisted. FIG. 5 illustrates cluster lines 404 through the bounding boxes of clusters of vehicles detected.

Figure 3:
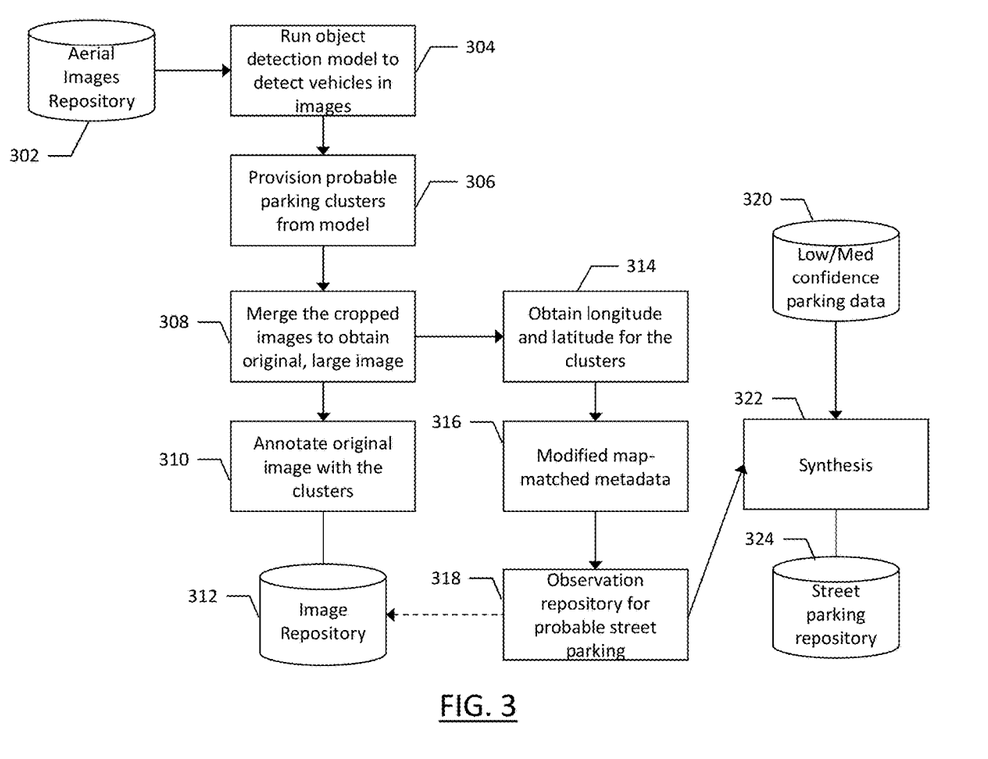
FIG. 3 is a process flow chart of identifying and confirming the presence of on-street parking along a road segment according to an example embodiment of the present disclosure.

Provisioning for probable parking clusters as described above with respect to FIG. 5 is illustrated at 306 of FIG. 3 following the object detection described above with respect to FIG. 4. Once the parking clusters are identified, the cropped, smaller images with cluster lines may be combined at 308 to form the original geo-referenced image and annotated at 310 with the resultant cluster lines, and stored in the image repository 312. The geo-referenced position of all resultant cluster lines (longitude and latitude) obtained at 314 based on the geo-referenced image may then be used to determine the indicative geospatial aspect on these lines and an individual metadata feature may be created for each of the parking cluster lines. This modified metadata is map matched at 316 and an observation repository for probable street parking, based on the aerial imagery, is established at 318 and may have reference to the image location of the annotated images of the image repository 312.

The map matching of the modified metadata at 316 may include identifying a feature object of the map corresponding to the parking cluster line. A feature object of the map, as described herein, may include a road segment, and the parking cluster lines may be compared against or map matched to feature object such as road segments. In such an embodiment, when a parking cluster line is substantially aligned with a road segment of a map and proximate the road segment based on map matching, the parking cluster line may be identified as street parking for that road segment. This map matching aspect of the present disclosure may distinguish embodiments from identifying parking spaces in a parking lot, where parking cluster lines may be prevalent. Parking lots may be identified as objects on a map such that they are better understood through maps presented to a user. However, street parking is not identified, and example embodiments described herein use the parking cluster lines, map matched to road segments, to identify street parking from aerial imagery in a manner not previously considered.

While the aforementioned technique describes identifying street parking from aerial imagery, embodiments may reinforce the confidence in identifying street parking by supplementing the aerial image data analysis with other available data sources. For example, vehicle probe data may be collected that can identify vehicles parked along the side of a road, striped/vacant parking spaces along the side of a road, parking meters along a road segment, etc.

Referring first to apparatus 200 of FIG. 2, the apparatus may include means, such as the communication interface 206, the processor 202, or the like, for preprocessing probe point data to determine potential on-street parking spaces. Although the probe point data may be preprocessed in various manners, the apparatus 200, such as the processor 202 or the like, discussed in FIG. 2 may be configured to preprocess the probe point data by performing some or all of the various operations described below.

In an example embodiment, the apparatus 200, including means such as the communication interface 206, the processor 202, or the like, for receiving a plurality of individual probe data points along a road segment. In some embodiments, each individual probe data point is associated with a location where each probe data point was obtained by one of one or more vehicles or other probe data point sources on the road segment. For example, in some embodiments, the navigation system and/or GPS system of one vehicle may capture one or more probe data points at various locations along a road segment. Additionally, a plurality of other vehicles may capture one or more probe data points along the same road segment. In some embodiments, vehicles capturing probe data points may be located along a roadway (e.g., within a certain proximity to the roadway, such as in parking spaces adjacent to the road). In some embodiments, the probe data points received by the apparatus 200 may include information relating to the vehicle at the time a probe data point was captured, such as one or more of the speed of the vehicle, the longitudinal and latitudinal location of the vehicle, the side of the street, the angle of the vehicle, the direction of the vehicle, the heading of the vehicle, the trajectory of the vehicle and the like.

Probe data may provide an indication of on-street parking through various means of detection. Probe data may include point cloud data from a LIDAR sensor that detects objects and boundaries of an environment. Probe data may optionally include imagery where object detection means, such as the means described above, may be used to process image data captured by vehicle probes to identify objects within the imagery. On-street parking may be established through the presence of stopped vehicles along the side of a road. This probe data may be relatively low-confidence data based on a potential to erroneously detect vehicles as parked along a road or mis-identifying objects as vehicles, for example. Thus, vehicle probe data may not be exclusively relied upon for identifying on-street parking absent a more robust mechanism by which vehicle probe data may be employed to more positively identify on-street parking.

In addition to or in place of probe data relating to on-street parking, embodiments of the apparatus 200 described herein, using processor 202, may use street-level reference images to identify potential on-street parking. This data may be used in a manner similar to that of the probe data in that the street level reference images may not be conclusive with respect to identifying on-street parking.

Figure 6:
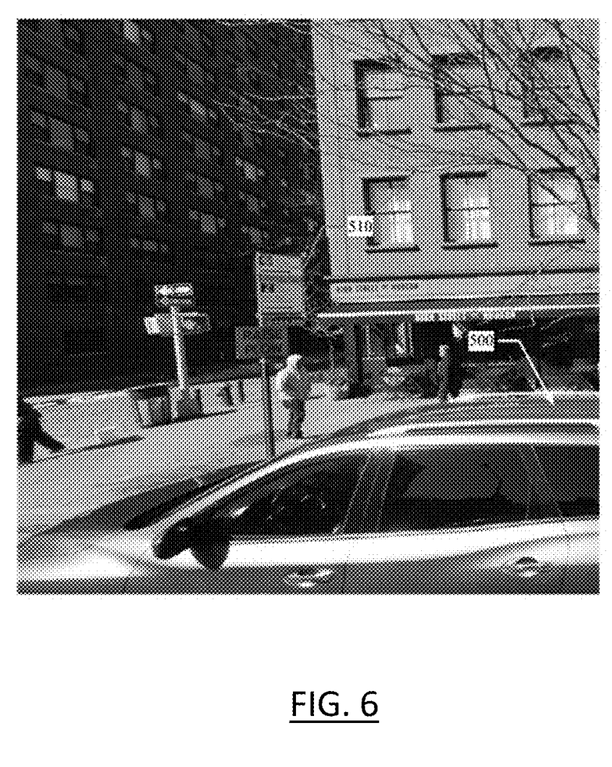
FIG. 6 illustrates street-view imagery that may be used to improve the accuracy and confidence of establishing the presence of on-street parking according to an example embodiment of the present disclosure.

FIG. 6 illustrates an example reference street-level image that may be used for verification of an on-street parking space. As seen in FIG. 6, the image may include one or more vehicles 500 parked along the street and may in some cases show a sign 510 designating on-street parking areas and/or indicating the parking regulation for a given stretch of on-street parking. In some embodiments, such information from a sign may allow additional information to be known about the parking spaces. For example, a sign, such as the sign 510 shown in FIG. 6, may indicate the beginning point of parking spaces, the end point of parking spaces, hours vehicles are allowed to park in the spaces (e.g., no parking from 9 AM to 5 PM), the type of vehicles allowed to park in the spaces (e.g., Emergency vehicles only), the time limit for a vehicle to be parked in a space (e.g., two hour limit), and/or the like. In some embodiments, the apparatus 200 may be configured to use the street-level imagery to verify on-street parking spaces. The apparatus 200 may include means, such as the processor 202 for determining that on-street parking is likely present in a given street level reference image.

Referring back to FIG. 3, the vehicle probe data or street-level imagery data at 320 may be used, for example by processor 202 of apparatus 200, in conjunction with the on-street parking established through aerial imagery at 318 through synthesis 322 to improve the accuracy and confidence with which on-street parking is established. The relatively high-confidence on-street parking may be stored in street parking repository 324. The synthesis may involve map-matching vehicle probe data and/or street imagery data to the map-matched on-street parking established through aerial imagery to provide a combined evaluation of whether on-street parking is available at a location along a road segment. This synthesis may provide a substantially greater confidence and be more reliable for identifying on-street parking to a user.

In various embodiments, the apparatus 200 includes means, such as the processor 202 or the like, for operating additional verification measures for the on-street parking spaces. In some embodiments, the apparatus 200 may receive crowd-sourced verification from one or more users indicating that one-street parking is valid. For example, a user may employ route guidance to a destination, such as using a navigation system provided or supported by map developer 116. The navigation system may provide an indication to a user of the availability of on-street parking proximate the user's destination. Upon arrival at the identified on-street parking, a user may positively confirm the availability of on-street parking. According to some embodiments, if the availability of on-street parking is not previously verified, a user may be prompted upon arrival at a location as to whether street parking was available. Further, a user may be prompted to enter information relating to the on-street parking, such as a time when it is legal, a maximum duration of parking, etc.

Figure 7:
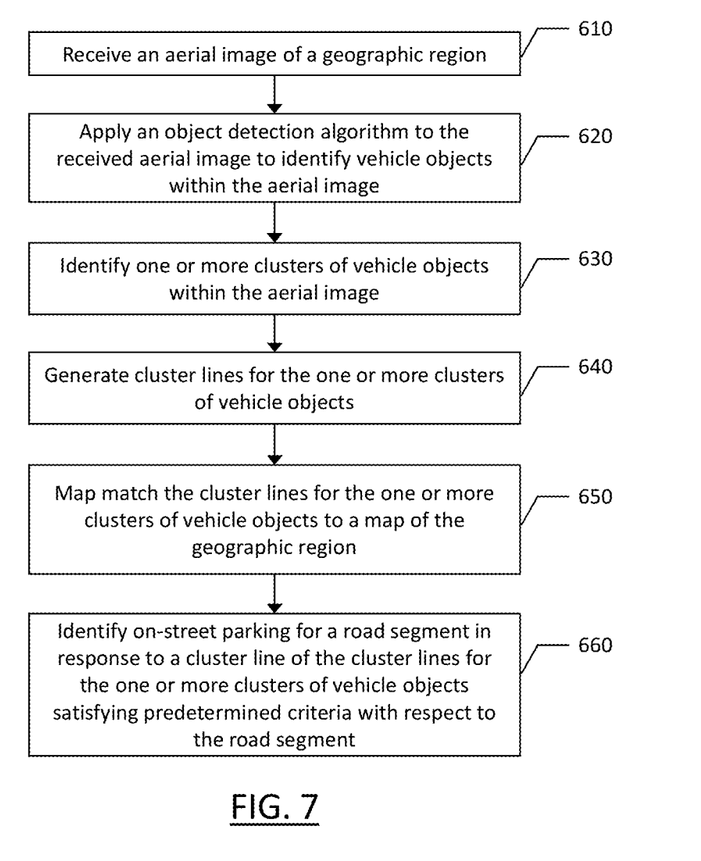
FIG. 7 is a flowchart of a method for identifying on-street parking from aerial imagery according to an example embodiment of the present disclosure.

FIG. 7 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method of estimating on-street parking based on aerial imagery. As shown, at 610, an aerial image of a geographic region may be received. An object detection algorithm may be applied to the received aerial image at 620 to identify vehicle objects within the aerial image. One or more clusters of vehicle objects may be identified within the image at 630. Cluster lines may be generated at 640 for one or more clusters of vehicle objects. The cluster lines for the one or more clusters of vehicle objects may be map matched at 650 to a map of the geographic region. Map matching the cluster lines involves finding a road link that most closely aligns with the cluster line. Various map-matching strategies may be employed to associate a cluster line with a road link. In response to a cluster line of the cluster lines for the one or more clusters of vehicle objects satisfying predetermined criteria with the road segment, on-street parking may be identified as shown at 660.

In an example embodiment, an apparatus for performing the method of FIG. 7 above may comprise a processor (e.g., the processor 202) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 202 and/or a device or circuit for executing instructions or executing an algorithm for processing information as described above.

In the context of a navigation application, the parking availability predictions from certain example embodiments of the invention may be utilized. Said navigation application may run in a mobile device application, in an embedded vehicle navigation/infotainment system, be provided as a service, and/or a network-based user interface such as a web page over a communications network, or the like. A user planning a route may enter a destination in the navigation application's user interface (e.g., user interface 208 of FIG. 2). The navigation application may provide a recommendation for on-street parking available proximate the destination. The aforementioned recommendations may be presented to the user as highlighted street/street segments on a user interface map view of the navigation view (e.g., highlighted on the map, or as a list of street/street segments where parking may be available). The recommendations may be ranked in order of likelihood of finding an available parking space or proximity to the destination, which may be conveyed to the user as a ranked list of streets/street segments, or as a color/color-intensity coded highlight on the map view of the navigation application.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining a presence of on-street parking, wherein the method is implemented by a processor including memory and computer program code, the method comprising:
   receiving an aerial image of a geographic region;
   applying an object detection algorithm to the received aerial image to identify vehicle objects within the aerial image;
   identifying one or more clusters of vehicle objects within the aerial image;
   generating cluster lines for the one or more clusters of vehicle objects;
   map matching the cluster lines for the one or more clusters of vehicle objects to a map of the geographic region; and
   identifying on-street parking for a road segment in response to a cluster line of the cluster lines for the one or more clusters of vehicle objects satisfying predetermined criteria with respect to the road segment.

2. The method of claim 1, wherein the predetermined criteria with respect to the road segment comprises a predefined alignment tolerance between the cluster line and the road segment.

3. The method of claim 2, wherein the predetermined criteria with respect to the road segment further comprises a predefined distance from the road segment.

4. The method of claim 1, wherein identifying one or more clusters of vehicle objects within the aerial image comprises:
   identifying a group of vehicle objects as a cluster in response to the vehicle objects of the group being within a predefined distance of at least one other vehicle object of the group and the vehicle objects of the group having a long dimension of their respective bounding boxes within a predetermined degree of alignment with one another.

5. The method of claim 1, wherein identifying on-street parking for a road segment is further in response to probe data points along the road segment identifying the on-street parking.

6. The method of claim 1, wherein receiving an aerial image of a geographic region comprises receiving a cropped image of a geographic region, the method further comprising reconstructing a plurality of cropped images of the geographic region in response to identifying one or more clusters of vehicle objects within the cropped image of a geographic region.

7. The method of claim 1, wherein in response to identifying on-street parking for a road segment, the method further comprises:
   providing route guidance to the on-street parking for the road segment proximate a destination of the route guidance.

8. An apparatus comprising at least one processor and at least one memory including computer program code, the at least one memory and computer program code configured to, with the processor, cause the apparatus to at least:
   receive an aerial image of a geographic region;
   apply an object detection algorithm to the received aerial image to identify vehicle objects within the aerial image;
   identify one or more clusters of vehicle objects within the aerial image;
   generate cluster lines for the one or more clusters of vehicle objects;
   map match the cluster lines for the one or more clusters of vehicle objects to a map of the geographic region; and
   identify on-street parking for a road segment in response to a cluster line of the cluster lines for the one or more clusters of vehicle objects satisfying predetermined criteria with respect to the road segment.

9. The apparatus of claim 8, wherein the predetermined criteria with respect to the road segment comprises a predefined alignment tolerance between the cluster line and the road segment.

10. The apparatus of claim 9, wherein the predetermined criteria with respect to the road segment further comprises a predefined distance from the road segment.

11. The apparatus of claim 8, wherein causing the apparatus to identify one or more clusters of vehicle objects within the aerial image comprises causing the apparatus to:
    identify a group of vehicle objects as a cluster in response to the vehicle objects of the group being within a predefined distance of at least one other vehicle object of the group and the vehicle objects of the group having a long dimension of their respective bounding boxes within a predetermined degree of alignment with one another.

12. The apparatus of claim 8, wherein causing the apparatus to identify on-street parking for a road segment is further in response to probe data points along the road segment identifying the on-street parking.

13. The apparatus of claim 8, wherein causing the apparatus to receive an aerial image of a geographic region comprises causing the apparatus to receive a cropped image of a geographic region, the apparatus further caused to reconstruct a plurality of cropped images of the geographic region in response to identifying one or more clusters of vehicle objects within the cropped image of a geographic region.

14. The apparatus of claim 8, wherein in response to causing the apparatus to identify on-street parking for a road segment, the apparatus is further caused to:
    provide route guidance to the on-street parking for the road segment proximate a destination of the route guidance.

15. A computer program product comprising at least one non-transitory computer-readable storage medium having computer-executable program code portions stored therein, the computer-executable program code portions comprising program code instructions configured to:
    receive an aerial image of a geographic region;
    apply an object detection algorithm to the received aerial image to identify vehicle objects within the aerial image;
    identify one or more clusters of vehicle objects within the aerial image;
    generate cluster lines for the one or more clusters of vehicle objects;
    map match the cluster lines for the one or more clusters of vehicle objects to a map of the geographic region; and identify on-street parking for a road segment in response to a cluster line of the cluster lines for the one or more clusters of vehicle objects satisfying predetermined criteria with respect to the road segment.

16. The computer program product of claim 15, wherein the predetermined criteria with respect to the road segment comprises a predefined alignment tolerance between the cluster line and the road segment.

17. The computer program product of claim 16, wherein the predetermined criteria with respect to the road segment further comprises a predefined distance from the road segment.

18. The computer program product of claim 15, wherein the program code instructions to identify one or more clusters of vehicle objects within the aerial image comprises program code instructions to:
   identify a group of vehicle objects as a cluster in response to the vehicle objects of the group being within a predefined distance of at least one other vehicle object of the group and the vehicle objects of the group having a long dimension of their respective bounding boxes within a predetermined degree of alignment with one another.

19. The computer program product of claim 15, wherein the program code instructions to identify on-street parking for a road segment is further in response to probe data points along the road segment identifying the on-street parking.

20. The computer program product of claim 15, wherein the program code instructions to receive an aerial image of a geographic region comprises program code instructions to receive a cropped image of a geographic region, the computer program product further comprising program code instructions to reconstruct a plurality of cropped images of the geographic region in response to identifying one or more clusters of vehicle objects within the cropped image of a geographic region.

* * * * *